United States Patent
Roll

Patent Number: 5,318,075
Date of Patent: Jun. 7, 1994

[54] DRIP STOP PLUG

[76] Inventor: Michael K. Roll, 9072 Truman St., San Diego, Calif. 92129

[21] Appl. No.: 121,441

[22] Filed: Sep. 13, 1993

Related U.S. Application Data

[63] Continuation of Ser. No. 861,626, Apr. 1, 1992, abandoned.

[51] Int. Cl.$^5$ .............................................. F16L 55/10
[52] U.S. Cl. ........................................ 138/89; 138/91
[58] Field of Search ............... 138/89, 90, 91; 137/68.1

[56] References Cited

U.S. PATENT DOCUMENTS

| | | | |
|---|---|---|---|
| 3,148,798 | 9/1964 | Brown | 138/89 |
| 3,157,203 | 11/1964 | Ver Nooy | 138/89 |
| 3,338,499 | 8/1967 | Gilbert | 138/89 |
| 3,613,936 | 10/1971 | Kaiser | 138/89 |
| 3,675,685 | 7/1972 | Potter | 138/89 |
| 3,807,457 | 4/1974 | Logsdon | 138/89 |
| 3,811,423 | 5/1974 | Dickinson, III et al. | 128/738 |
| 4,114,653 | 9/1978 | Carlin | 138/89 |
| 4,185,665 | 1/1980 | Flimon | 138/89 |
| 4,357,960 | 11/1982 | Han | 138/97 |
| 4,607,664 | 8/1986 | Carney et al. | 138/89 |
| 4,627,850 | 12/1986 | Deters et al. | 106/196 |
| 4,930,459 | 6/1990 | Coffenberry | 138/89 |
| 4,952,429 | 8/1990 | Schmitz et al. | 138/129 |
| 5,186,214 | 2/1993 | Savard | 138/97 |

FOREIGN PATENT DOCUMENTS

| | | | |
|---|---|---|---|
| 2853532 | 10/1979 | Fed. Rep. of Germany | 138/89 |
| 3638732 | 3/1988 | Fed. Rep. of Germany | 138/89 |

*Primary Examiner*—Philip R. Coe
*Assistant Examiner*—James F. Hook

[57] ABSTRACT

A water soluble drip stop plug for stopping water flow in a pipe and for dissolving after a predetermined time after water flow is restored. The plug is a cup shaped water soluble plug which has tapered sides to fit snugly into the inside diameter of pipes. The end wall of the plug is designed to dissolve in a predetermined time after contact with fluids. The end wall of the plug has a different wall thickness than the side wall of the plug. A preferred embodiment has an end wall with a portion of reduced wall thickness which allows it to break away quicker than the remainder of the end wall. Additionally, the drip stop plug may have reinforced side walls to provide support for plugs of larger diameter.

18 Claims, 3 Drawing Sheets

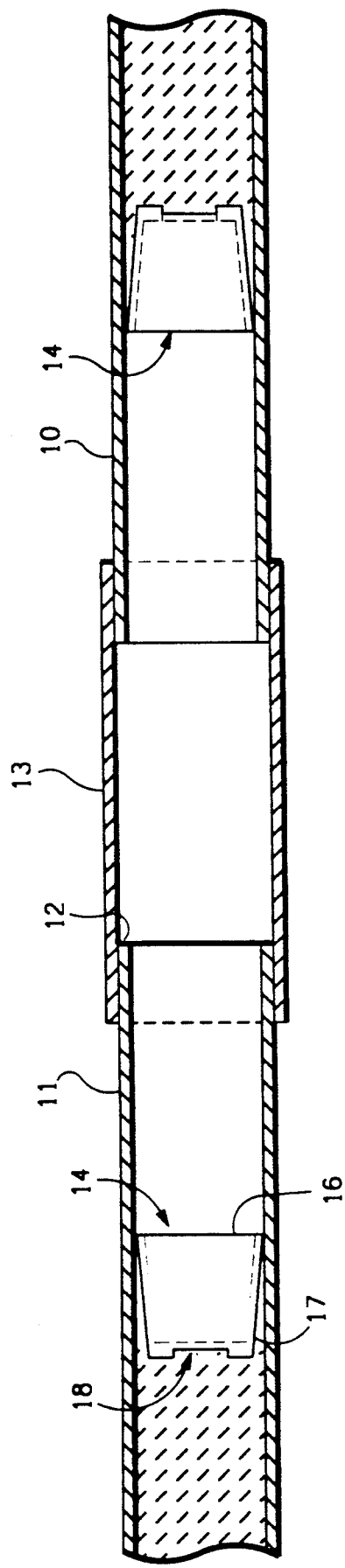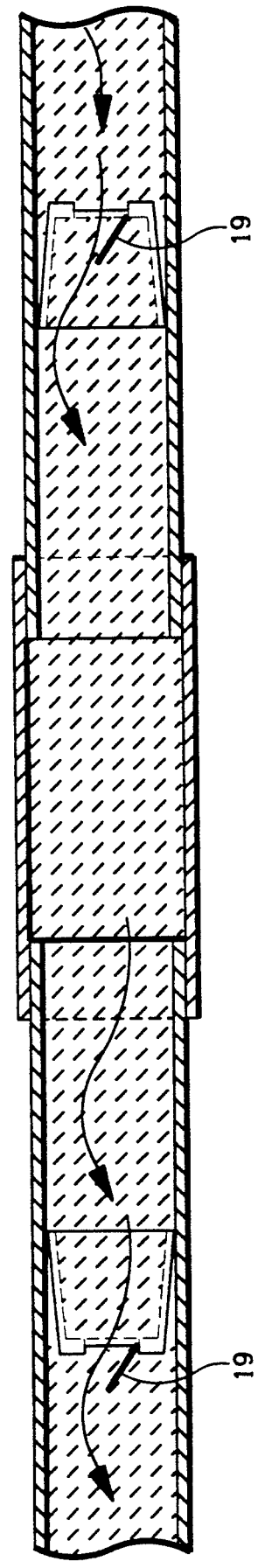

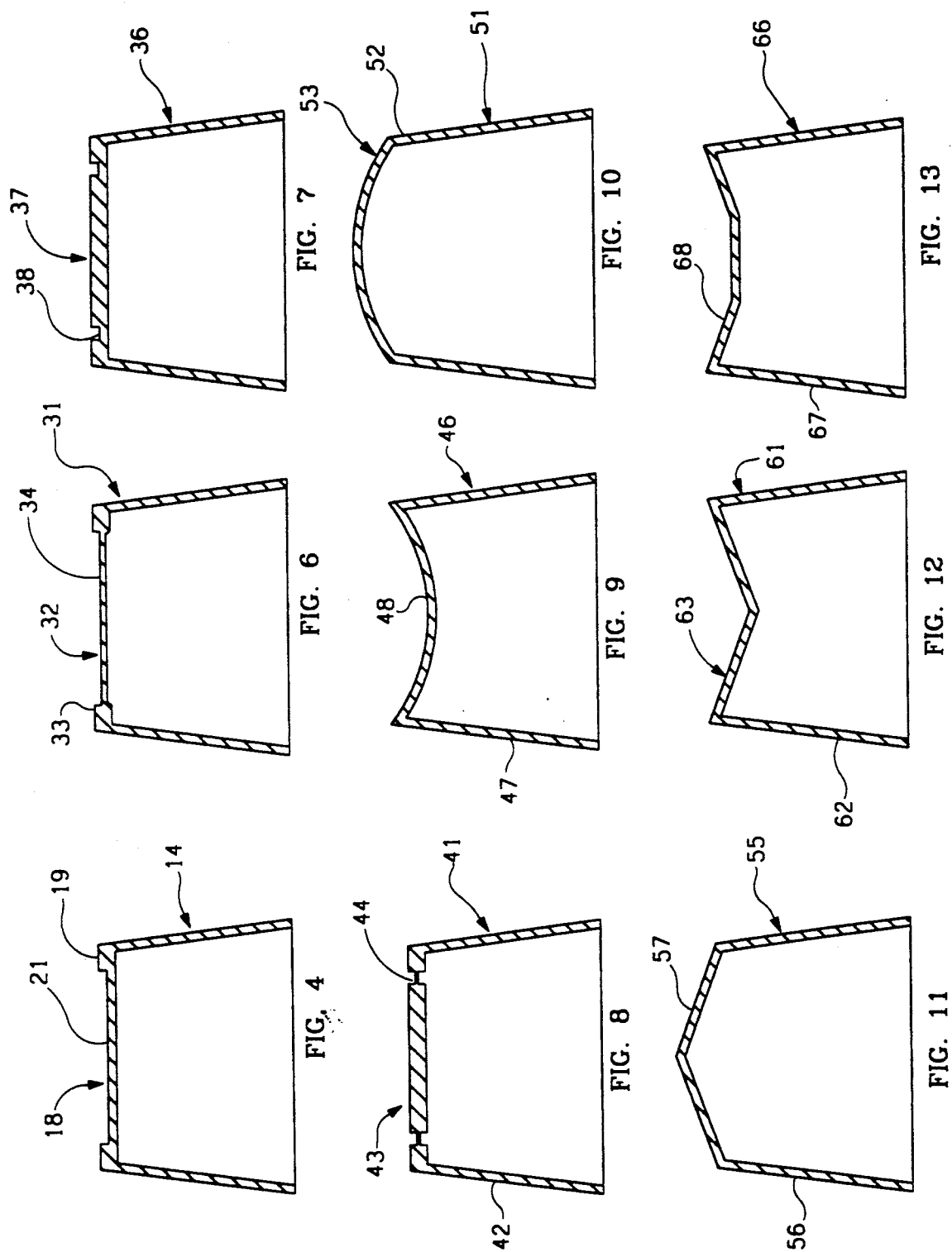

DRIP STOP PLUG

This is a continuation of copending application Ser. No. 07/861,626 filed on Apr. 1, 1992 now abandoned.

BACKGROUND OF THE INVENTION

I. Field of the Invention

This invention relates to a water soluble drip stop plug for stopping dripping or water flow in a pipe and for dissolving after a predetermined time after water flow is restored to permit unimpeded flow, and more particularly to a cup shaped water soluble drip stop plug which has a unique configuration to allow for dissolution at various predetermined times.

II. Description of Related Art

A number of prior art patents have recognized the desirability of shutting off the flow of water in a pipe to permit repairs to be made. U.S. Pat. No. 4,357,960 issued to Han on Nov. 9, 1982, entitled *Plumbing Method And Composition For Use In Same* discloses the use of plugs of water soluble alginate into the open ends of a pipe to allow a repair to be made, after which the alginate dissolves, allowing water flow to be restored.

U.S. Pat. No. 4,003,393 issued to Jaggard on Jan. 18, 1977, entitled *Gel-Like Composition for Use as a Pig in a Pipeline* discloses the use of a gel-like composition as a pig or blockage in a pipeline. The gel-like mass is disclosed as a hydrocarbon liquid gel with a metal salt. The pig is used to separate the fluids in a conduit by introducing the gel between the flowing fluids. U.S. Pat. No. 3,631,870 issued to Livingston on Jan. 4, 1972, entitled *Method of Stopping Flow in a Pipeline* also discloses a method of arresting the flow of liquid in a pipeline so the pipeline can be repaired by transforming the flowing liquid into a gel to form a plug of material which stops flow downstream. U.S. Pat. No. 3,338,499 issued to Gilbert on Aug. 29, 1967, entitled *Device for Welding Pipe Ends* discloses the use of water soluble plastic plugs to seal the ends of two pipes in order to allow them to be welded. After the repair is made, the plastic plugs are dissolved by flushing with water.

All of the foregoing plugs and methods have some or all of the following limitations or disadvantages:

1. The plugs are not designed for dissolving at a predetermined period of time after water is restored.

2. The plugs are not designed to have the end break away prior to dissolution of the sides.

3. The plugs have a large indeterminate volume of material which needs to be purged from the pipe.

SUMMARY OF THE INVENTION

The present invention relates to a new and novel tapered drip stop plug made of a water soluble plastic material. The plug is typically cup shaped and has tapered sides to fit snugly into the inside diameter of pipes, even though, the pipes may have slight variations in wall thicknesses, to securely seal water, liquid or gases during repair operations. The cup shape is advantageous in that it has a much smaller volume enabling it to dissolve and be purged from the pipe in a shorter period of time. The end portion of the plug is designed to be made in various thicknesses and configurations that will dissolve at a predetermined time period upon contact with non-pressurized fluids. This allows for a specific working or repair time. The end portion is typically designed to dissolve prior to the side wall. Upon repressurization of the pip system, the end section breaks away quickly, allowing quick dissolution of the plug.

A preferred embodiment of the plug has an end portion which has a portion of reduced wall thickness allowing it to break away quicker than the remainder of the end portion or the side wall to save time after repair is completed. Various configurations of a plug having a dual thickness end portions are described. The drip stop plug may also have reinforced side walls to provide support for plugs of larger diameter.

Other aspects of the present invention will become apparent from the following detailed description when considered in conjunction with the accompanied drawings. It should be understood, however, that the detailed description and the specific examples, while representing the preferred embodiment, are given by way of illustration only.

BRIEF DESCRIPTION OF THE DRAWINGS

FIG. 1 is a cross-sectional view of a pipe having a broken section showing drip stop plugs being installed upstream and downstream of the break, keeping the area to be repaired free of flow of liquid.

FIG. 2 is a cross-sectional view of a section of repaired pipe, illustrating the break-away ends of the drip stop plugs after flow is restored.

FIG. 4 is a cross-sectional view taken along line 4—4 of FIG. 3 illustrating the configuration of the end portion of the plug.

FIGS. 6–13 are cross-sectional views of alternative embodiments of the drip stop plug, illustrating different configurations of the end portions.

DETAILED DESCRIPTION OF THE INVENTION

Figure 5:
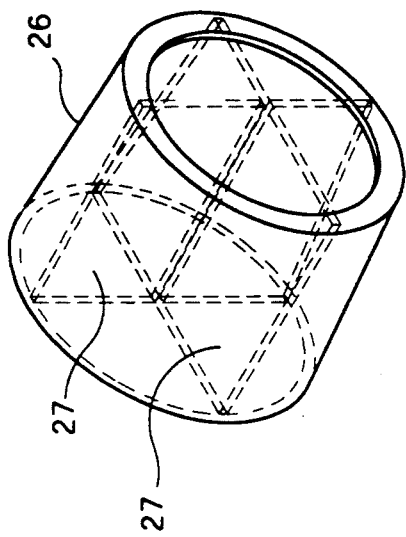
FIG. 5 is a perspective view of an alternative embodiment of a drip stop plug having reinforced side walls.

The following description is of the best presently contemplated modes of carrying out the invention. This description is made for the purpose of illustrating the general principles of the invention and should not be taken in a limiting sense.

In accordance with the present invention, there is shown in FIGS. 1 and 2 a section of broken pipe having an upstream section 10 and a downstream section 11 with a break 12 therebetween. Before fitting a repair sleeve 13 over the broken ends of the pipe 10 and 11, a drip stop plug generally designated as 14 is inserted far enough inside the ends of the pipe to enable the repair area to be kept dry. Of course, water pressure is shut off in the pipe due to the breakage. The plugs are preferably inserted into the ends of each pipe with the open end 16 adjacent to the breakage. Usually, only one plug is needed on the upstream side to stop water flow. However, if the downstream side of the break is higher than the upstream side or if water is present in the downstream side, it may also be necessary or desirable to plug the downstream side as well. The side wall 17 of the plug 14 is tapered. It has been found that a taper of $2.5° \pm 0.5°$ is an acceptable taper to allow the plug to fit snugly in the pipe even though the inner diameter of the pipe has slight variations. This taper is sufficient to securely seal water, liquid or gases during repair of the pipe. FIGS. 1 and 2 show the taper in an exaggerated form for purposes of illustration. The drip stop plug 14 has an end wall 18 which is designed to break away upon restoration of water pressure, as more fully described hereafter.

The use of the plug in this manner enables the repair to be completed without any water flowing into the repair area. In the case of a PVC repair, the repair will be made by gluing the ends of the pipe to the repair sleeve 13. In the case of other materials being used, either soldering, or even welding, could occur. So long as the drip stop plug is inserted far enough away from the repair area, the heat of any welding or soldering will not adversely affect the plug.

The plug 14 can be made of any water soluble material that can be designed to dissolve and break away after a predetermined period of time. It has been found to be particularly desirable to use POLYOX compound WRPA-3154 manufactured by Union Carbide Corporation. POLYOX is a polyethylene oxide material.

Referring to FIG. 2, there is shown water pressure being restored and the end flap 19 breaking away from the end wall 18 of the plug, allowing water pressure to flow through the pipe. Shortly after water pressure is restored, the entire plug will be dissolved and disappear from the system, leaving no residue to impede water flow.

The drip stop plug is designed so that the normal water remaining in the system which reacts with the water soluble material will not break through the end wall 18 for a predetermined period of time, typically two to forty minutes, again allowing for a specific working time. However, when the force of the restored water is returned, the force of the water pressure against the partially dissolved end wall 18 causes the end to rupture or break away to restore water flow throughout the system quickly after it is turned on.

Figure 3:
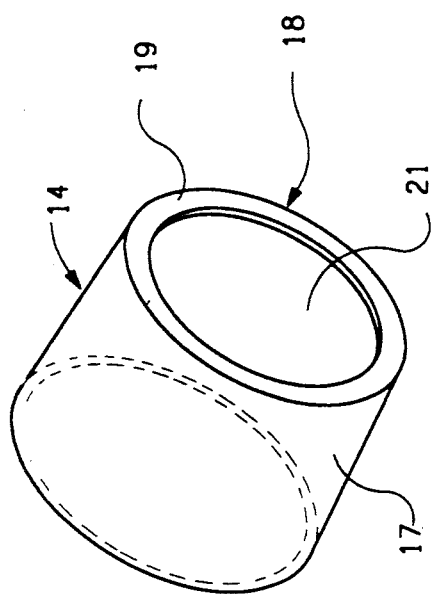
FIG. 3 is a perspective view of a preferred embodiment of a drip stop plug.

Referring to FIG. 3, there is shown a drip stop plug generally designated as 14. The side wall 17 of the plug is tapered as previously described to securely fit within the inside of a pipe, even though the pipe may have minor variations in wall thickness and interior diameter. The taper of the plug allows the plug to be inserted in the pipe securely enough so that after the pipe ends have been dried, they will remain dry until the repair has been accomplished. The end wall 18 of the plug 14 has two wall thicknesses, the outer annulus 19 being thicker than the central portion 21. This stepped configuration of the end wall 18 causes the central portion 21 to break away or dissolve first when water is present.

The Union Carbide POLYOX material has been found to be an ideal material for this invention. After being formed into the cup shape, it has the strength, elasticity and water-soluble characteristics required for the subject invention. Other desirable properties of the POLYOX material include (1) when wet it is very slippery so it will slide into place in a pipe very easily; and (2) when wet, if you slide it into the end of a pipe and hold it in place for a moment, it has an adhesive property which keeps the plug from sliding back out. These properties allow the plug to hold back a column of water determined by the strength of adhesion and also by the strength of the break-away end wall section. Thirdly, the POLYOX material completely dissolves when water pressure is returned, leaving no residue. Additionally, the major ingredient in the POLYOX material allows it to be used safely in potable water systems.

This invention, while suitable for PVC and ABS pipes, is also ideal for repairing or modifying copper water piping systems. Whenever there is a leak, or a modification like a T or branch line needs to be made to copper pipe, new joints need to be made. Most permanent joints are made by soldering. There may be some mechanical joints, but there are only good for exposed locations where they can be tightened if they leak. All solder joints, in order to be good, need to be clean and dry. First, the copper pipes adjacent to the joint and the sleeve or fitting are sanded clean. Then a flux is applied. The joint is then heated and soldered. If water is present, it will steam and bubble through the joint, making pin holes which result in a failed joint. Further, any water present will act like a heat sink, drawing heat away from the joint, resulting in a cold solder joint which will ultimately fail.

In using the subject drip stop plug for a repair or modification involving copper pipe, the plug is desirably inserted at least six inches or more into the pipe. The water adjacent to the end wall of the plug will act like a heat sink, protecting the plug. The plug can be placed far enough away from the joint to enable soldering to be completed. Typically, when working with existing water pipes, the shut off valves don't completely stop the flow of water, allowing a small steady stream to flow through the pipe. Further, in many systems there is a large volume of water, often at different levels, that is difficult to remove in order to facilitate the repair. The subject drip stop plug would prevent any water from reaching the repair area for a predetermined time period.

Referring now to FIG. 4 there is shown a cross section of the drip stop plug 14 showing the thicker wall thickness of the annular portion 19 of the end wall 18 and the thinner wall thickness of central portion 21. The central portion 21 will partially dissolve first and the weakened end will break away when the water pressure is turned on.

Referring to FIG. 5 there is shown a drip stop plug generally designated as 26, which is similar to the drip stop plug 14 except that it is reinforced internally with a cross or two intersecting planes 27 of the same material as the drip stop plug is made. Alternatively, the side wall thicknesses can be increased to provide similar support, particularly in cases where the plug is used for larger pipe sizes.

Referring to FIG. 6 there is shown a cross section of an alternative embodiment of a drip stop plug generally designated as 31, which has an end wall 32 having an annular section 33 of one wall thickness and a center diameter portion 34 of a smaller wall thickness. The center portion 34 is recessed in, both from the outside and the inside of the end wall 32.

Referring to FIG. 7, there is another alternative embodiment of a drip stop plug generally designated as 36 having an end wall 37 which has an annulus 38 of reduced thickness formed therein. The annulus 38 will dissolve and break away prior to end or side walls.

Referring to FIG. 8, there is shown another embodiment of a drip stop plug 41 having a tapered side wall 42 and an end wall generally designated as 43 and having an annular portion 44 of reduced wall thickness formed therein which breaks away early upon water pressure being applied to the end wall. The annular portion 44 is recessed from both the outside and inside of the end wall 43.

It is, of course, apparent that any of the configurations of FIGS. 4, 6, 7 and 8 could be formed with an end wall of a single thickness. However, depending on the pretermined dissolve time desired, the end wall may be too thin to support the side wall. Thus, it is preferred that the end wall be relatively thick around its circumference for adequate support, but have a thin central section formed therein to dissolve and break away after a predetermined time.

Referring to FIG. 9, there is shown another embodiment of a water soluble plug 46 having tapered side walls 47 and a concave end wall 48.

FIG. 10 shows another embodiment of a drip stop plug 51 having tapered side walls 52 and a convex end wall 53.

FIG. 11 shows an alternative embodiment of a drip stop plug 55 having tapered side walls 56 and a conical end wall 57.

FIG. 12 shows an alternative embodiment of a drip stop plug 61 having tapered side walls 62 and an inverted conical end wall 63.

FIG. 13 shows another embodiment 66 of a drip stop plug having side walls 67 with an inverted dome shaped end wall 68. Similarly, the dome shaped portion could be formed exteriorly of the drip stop plug 66, similar to the plug shown in FIG. 11.

All of the embodiments shown in FIGS. 9, 10, 11, 12 and 13 could also have thinner central portions or a thin annulus formed therein, as shown in FIGS. 4, 6, 7 and 8. Obviously, many different end shapes could be utilized for purposes of carrying out the subject invention.

Figure 14:
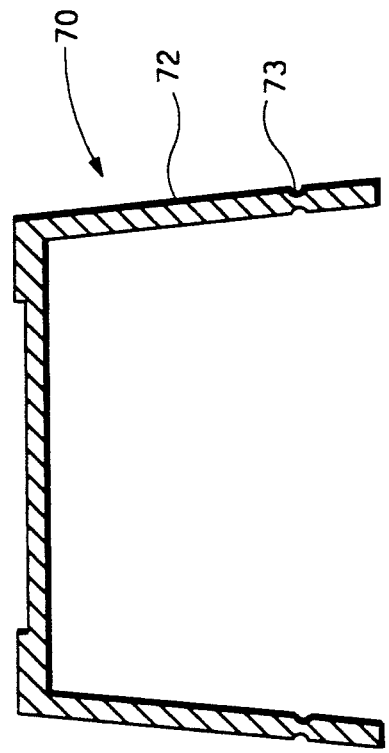
FIG. 14 is a cross-sectional view of a drip stop plug suitable for use in pipes of different diameters.

Referring to FIG. 14, there is shown a drip stop plug 70 which has a tapered side wall 72. The side wall 72 has a seam 73 of reduced wall thickness formed therein. A plurality of seams 73 can be formed. This allows the plug to fit into pipes of different internal diameter. In a smaller diameter pipe, the seam 73 is cut or torn to remove a portion of the side wall.

To test the subject drip stop plug, a series of four test plugs for ¾" Schedule 40 PVC pipe were molded out of Union Carbide's POLYOX WRPA-3154 material. The first series had an end wall thickness of approximately 0.005. Each subsequent series had its end wall thickness increased by increments of approximately 0.006. In the test procedure, five plugs from each series were inserted one at a time into a vertical 13" length of PVC pipe. Room temperature water was poured into the pipe until there was a 12" column, and the time until the water dissolved through the end wall of the plug was measured. The average results are shown below:

| Test Plug Series | Average Side Wall Thickness | Average End Wall Thickness | Average Time |
|---|---|---|---|
| 1 | .025 | .0064 | 2 min 12 sec |
| 2 | .025 | .0122 | 9 min 35 sec |
| 3 | .025 | .015 | 17 min 13 sec |
| 4 | .025 | .022 | 38 min 4 sec |

The configuration of the test plugs for the foregoing tests was the configuration shown in FIG. 4.

Based on the foregoing tests, it has been found that approximately 0.012–0.020 wall thickness of the end wall will be good for approximately 10–20 minutes of time to repair a joint. The design goal is to allow at least 20 minutes without any pressure applied before the plug dissolves and allows flow. Longer repair times can be accomplished by using plugs of thicker end wall thickness or by inserting more than one plug in the pipe to be repaired.

While the plug has been described for use in repairing pipes, it could also be used as a test plug for other purposes, such as leak testing drain, waste or vent systems. For such purposes a plug configuration could be designed to hold water or fluid for up to several hours.

Further, while the invention has been described herein with respect to water pipes and water soluble plugs, it is equally applicable to other fluids or gases and plugs made of a material that dissolves when contacted by such fluids or gases.

Although the present invention has now been described in terms of certain preferred embodiments and exemplified with respect thereto, one skilled in the art will readily appreciate that various modifications, changes, omissions and substitutions may be made without departing from the spirit thereof. It is intended therefore that the present invention be limited solely by the scope of the following claims.

I claim:

1. A drip stop plug for allowing repair of a broken water pipe in which water flow is temporarily terminated comprising:
    a cup shaped plug adapted to be fully inserted into a water pipe to keep any residual water away from the portion of pipe under repair, said plug made entirely of a water soluble material having a side wall of a first thickness and an end wall of a second thickness, said end and side wall thicknesses being selected to allow a predetermined time for repair of the pipe during which the plug partially dissolves and wherein said plug fully dissolves upon restoration of water flow.

2. A drip stop plug as set forth in claim 1 wherein said side wall is tapered and said end wall breaks away from said side wall upon restoration of water flow.

3. A drip stop plug as set forth in claim 2 wherein said first thickness is greater than said second thickness.

4. A drip stop plug as set forth in claim 1 wherein said end wall has a thick circumferential portion of said second thickness and a central portion which is thinner than the circumferential portion.

5. A drip stop plug as set forth in claim 4 wherein said thinner central portion is recessed from both the inner and outer sides of said end wall.

6. A drip stop plug as set forth in claim 3 wherein said end wall has an annular portion formed therein which is thinner than the remainder of said end wall.

7. A drip stop plug as set forth in claim 6 wherein said annular portion is recessed from both the inside and the outside of said end wall.

8. A drip stop plug as set forth in claim 1 wherein said first and second thickness are substantially the same.

9. A drip stop plug as set forth in claim 2 wherein said end wall is concave.

10. A drip stop plug as set forth in claim 2 wherein said end wall is convex.

11. A drip stop plug as set forth in claim 2 wherein said end wall is conical.

12. A drip stop plus as set forth in claim 2 wherein said end wall is concave and conical.

13. A drip stop plug as set forth in claim 2 wherein said end wall is dome shaped.

14. A drip stop plug as set forth in claim 2 including means for reinforcing the side and end walls of the plug.

15. A drip stop plug as set forth in claim 14 wherein said reinforcing means are made of the same material as the plug.

16. A drip stop plug as set forth in claim 15 wherein said reinforcing means comprise two intersecting planes of water soluble material positioned within the cup shaped plug so that the side edges are connected to the inner surface of the side wall and the edges adjacent to the end wall are connected to the inner surface of the end wall.

17. A drip stop plug as set forth in claim 2 wherein said side wall has at least one seam of reduced thickness around its circumference to allow separation of a portion of the side wall so that the plug will fit pipes of varying diameters.

18. A drip stop plug as set forth in claim 2 where said water soluble material is a polyethylene oxide.

* * * * *